Nov. 29, 1960 L. L. HODGSON 2,962,281
MOUNTING DEVICE FOR OUTLET BOXES
Filed May 20, 1955 2 Sheets-Sheet 1
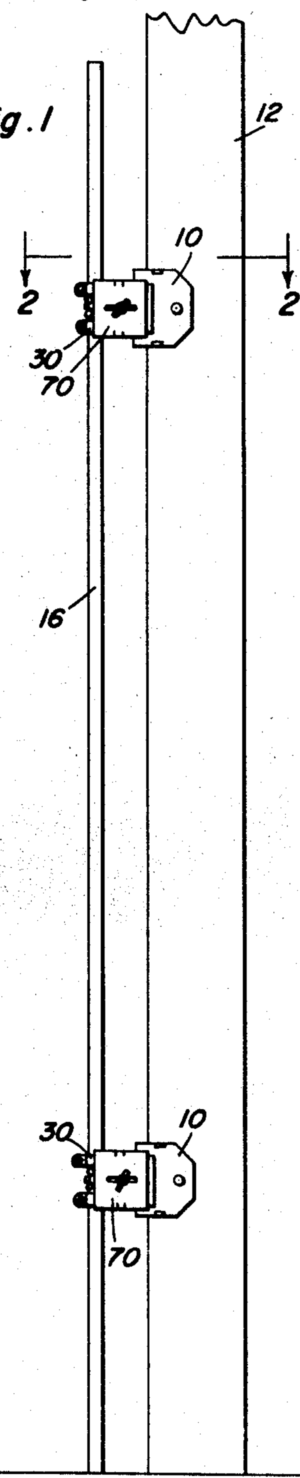
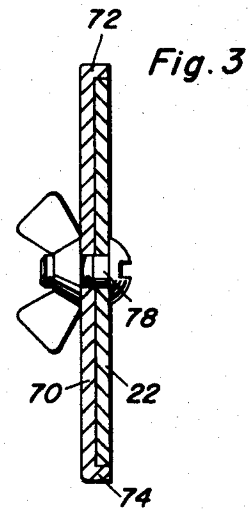
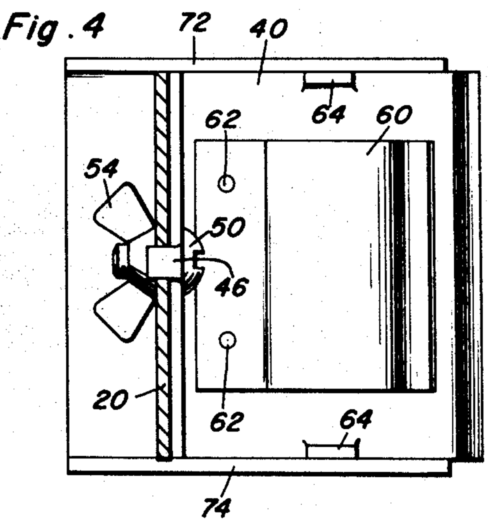
Leonard L. Hodgson
INVENTOR.
BY Clarence A. O'Brien
and Harvey B. Jacobson
Attorneys Nov. 29, 1960 L. L. HODGSON 2,962,281
MOUNTING DEVICE FOR OUTLET BOXES
Filed May 20, 1955 2 Sheets-Sheet 2
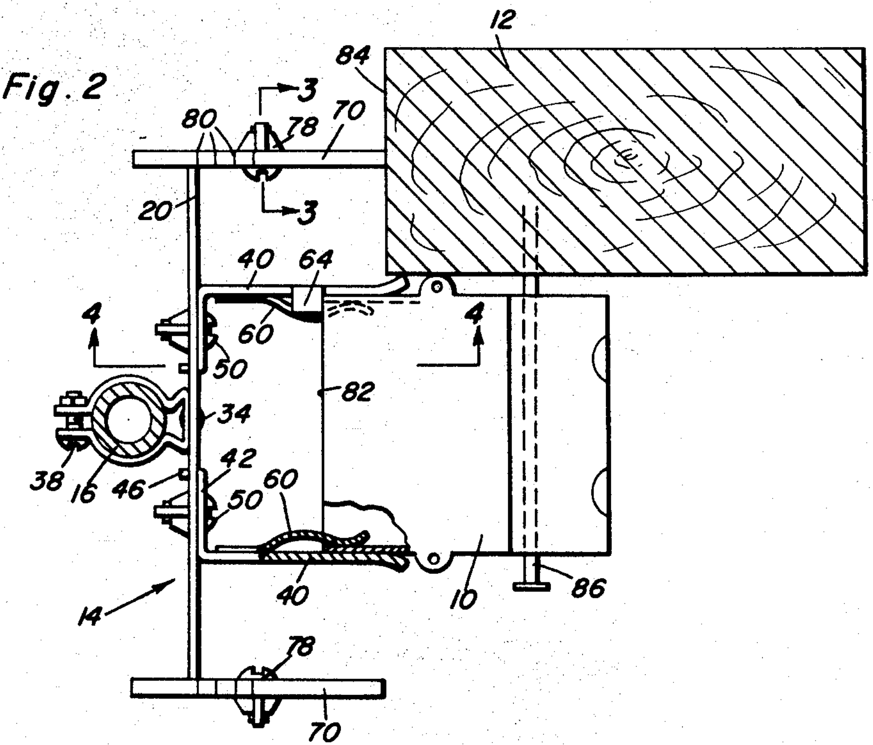
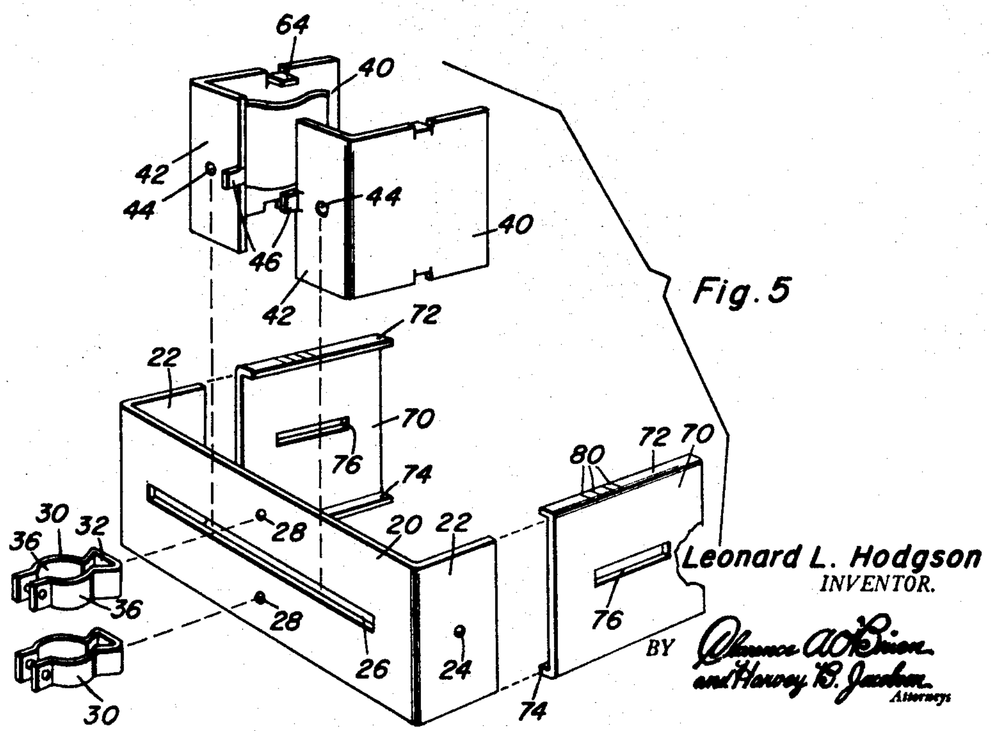
Leonard L. Hodgson
INVENTOR.
BY Clarence A. O'Brien
and Harvey B. Jacobson
Attorneys United States Patent Office 2,962,281

Patented Nov. 29, 1960

2,962,281

MOUNTING DEVICE FOR OUTLET BOXES

Leonard L. Hodgson, 901 S. 1st West, Missoula, Mont.

Filed May 20, 1955, Ser. No. 509,784

9 Claims. (Cl. 269—190)

This invention comprises novel and useful improvements in a mounting device for outlet boxes, and more specifically relates to a support assembly whereby electrical outlet boxes may be easily and precisely mounted in predetermined vertical positions and with predetermined offsets from vertical surfaces.

The primary object of this invention is to provide a mounting assembly whereby many conventional types of electrical outlet boxes may be quickly, easily and with precision fixedly positioned at various predetermined vertical elevations, as for use for wall switches or wall outlets in building constructions; and may be adjustably offset from vertical surfaces, as for example, to permit the finishing of a wall in which the outlet box is to be recessed.

A further object of the invention is to provide a mounting assembly whereby conventional types of electrical outlet boxes may be quickly and easily grasped and supported by the assembly for positioning at various elevations and at various distances from vertical surfaces.

Still another important object of the invention is to provide a mounting assembly, is accordance with the preceding objects, which shall afford a visual indicia of the amount of offset of an outlet box carried by the device from a vertical surface to which the box is to be associated.

Yet another object of the invention is to provide a mounting assembly in compliance with the preceding objects wherein the same may be readily and easily supported by an electrical conduit while permitting the aforesaid adjustments.

Still further important objects of the invention are to provide a mounting assembly by means of which outlet boxes may be easily mounted in predetermined vertical heights with respect to a vertical surface; in which the offset of each box from the vertical surface may be easily adjusted; which will assure that the box is mounted in a level position; which will function to hold the box securely in the desired position until the box has been secured to its vertical surface; and which will attain the above mentioned objects in a relatively inexpensive construction and one which may be quickly and easily applied with a saving of the time customarily required for the mounting of outlet boxes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary vertical elevation showing the manner in which a pair of outlet boxes may be vertically adjusted and positioned with respect to a vertical surface to which the boxes are to be attached;

Figure 2 is a horizontal sectional view taken substantially upon the plane indicated by the section line 2—2 of Figure 1 and illustrating the manner in which the box is offset from the vertical surface while being positioned for attachment to that surface;

Figure 3 is a detail view taken in vertical section substantially upon the plane indicated by the section line 3—3 of Figure 2 and showing the manner in which the adjustable offset members are clamped to the base structure of the device;

Figure 4 is a vertical sectional view taken substantially upon the plane indicated by the section line 4—4 of Figure 2 and showing more particularly the manner in which the supports for an outlet box, and the spring clips of the supports are secured to the base member of the device, the box being omitted from this view; and Figure 5 is an exploded perspective view of the various elements making up the mounting device in accordance with this invention.

Referring to Figures 1 and 2, it will be seen that the numeral 10 designates a conventional form of electric outlet box which is to be secured to the vertical surface of a vertical member 12, which may form part of a building structure, by the mounting device or mounting assembly forming the subject of this invention and indicated generally by the numeral 14, while the numeral 16 designates a pipe or conventional electric conduit which, as shown, is vertically disposed in proximity to the vertical member 12 and which is utilized to support the mounting assembly as set forth hereinafter.

The mounting assembly, referring chiefly to Fig. 5, consists of a base 20 preferably in the form of a flat strip of metal which at its ends is provided with perpendicularly disposed laterally extending projecting arms 22 positioned parallel to each other and which arms at their central portions are provided with apertures 24. Located medially of the base 20 is a longitudinally extending slot 26, while a pair of apertures 28 are disposed centrally of the base and each upon opposite sides of the slot. A pair of fasteners 30 are employed to secure the base at a vertically selected or predetermined position upon the conduit 16. Conveniently, these fasteners may consist of a single flat strip of material bent to provide a flat base 32 which is secured to the base 20 as by means of rivets or screws 34 cooperating with apertures 28. The fasteners 30 have a pair of arcuately disposed members 36 which are which are adapted to embrace the conduit 16 and to be clamped thereon, as by the fastening bolt 38.

Longitudinally adjustably mounted upon the base 20 are a pair of supports, each of which consists of a plate 40, the plates being adapted to be disposed normally of the base 20 with foot portions 42 in the form of perpendicular flanges adapted to slide upon the flat inside surface of the base 20. The flanges 42 are provided with apertures 44, disposed centrally thereof, and at the midportion of their vertical edges are provided with laterally projecting lugs 46. The lugs 46 constitute guide means and are adapted to be slidably received in the slot 26, as will be apparent from Figure 2, to prevent twisting of the supports 40 and to maintain the same in parallel relation during their relative sliding movement in the slot upon the base. Fasteners 50, see also Figure 4, in the form of bolts having shanks slidably received in the slot 26, and wing nuts 54 are provided whereby the supports are held against the base 20, are longitudinally slidable thereof by means of the engagement of the guide lugs 46 and the fasteners 50 in the slot 26, and may be locked in longitudinally adjusted and spaced position.

The spacing between the pair of supports 40 will be such as to snugly receive an outlet box 10 therebetween, as shown in Figure 2. This adjustability of the supports permits the device to be utilized in mounting outlet boxes of substantially all types and sizes.

In order to releasably clamp the outlet box to the embracing support plates 40, there are provided spring clips 60 in the form of resilient metallic plates having an inherent resiliency and which are secured to the supports, as at 62, see Fig. 4, in any desired manner, as by welding, riveting or the like. The clips 60, as will be apparent from Figure 2, are adapted to yieldingly press against the side walls of an outlet box 10 to thereby yieldingly clamp and retain the outlet box between the pair of support plates 40.

At their upper and lower edges, and substantially intermediate their ends, support plates 40 are provided with deformed inwardly turned lugs 64, which are disposed on opposite sides of the spring clips 60, and which function to support or engage the top and/or bottom surfaces of the outlet boxes 10 when the latter are clamped by the spring clips to the supports.

As so far described, it will now be apparent that the supports may be adjusted towards and from each other in accordance with the size of the outlet box to be supported thereby, and the latter may be easily engaged with and resiliently retained by the spring clips and supported upon or between the lugs 64, whereby when the device is adjusted vertically upon the conduit 16, the outlet box will be held in the desired vertical position in proximity to the vertical member 12.

Means are provided whereby the outlet box may be held at a predetermined position offset from the vertical surface of the vertical support in order that the box may be properly positioned for such purposes as recessing the box in a finished wall surface or the like. The offset means consists of a pair of plates 70 having upon their upper and lower edges inturned flanges 72 and 74 which are adapted to slidably embrace the upper and lower edges of the projecting arms 22 of the base 20. Longitudinal horizontally extending slots 76 are provided in the offset member 70 which are adapted to register with the apertures 24 previously mentioned in order that adjustable fasteners 78, see Figure 3, may be passed through the slot and aperture and clamp the offset members 70 in various longitudinally adjusted positions upon the arms 22. It will be seen that the flanges 72 and 74 thus serve as guiding means for positioning the plates 70 upon the arms, and that by means of the adjustability afforded by the fasteners 78 and the aperture and slot arrangement, the members 70 may be adjustably extended from the arms to provide adjustable extensions therefor. One or both of the flanges of the offset member 70 may be provided with indicia 80 which are adapted to cooperate with an adjacent portion of the base 20, such as the vertical edges of the members 22 or the base plate 20, and these indicia may be calibrated in order to visually indicate the amount of offset from the front edge 82 of the outlet box 10 from the associated front vertical surface 84 of the vertical member 12. Thus, by adjusting the offset members 70 with respect to the arms 22 of the base 20, the mounting assembly will easily and quickly position the front edge 82 of the outlet box at a desired offset distance with respect to the front vertical surface 84 of the vertical member 12. It will thus be seen that the device may be employed to position an outlet box of any conventional character in proper position relative to a vertical member 12 upon which the box is to be mounted at a desired vertical distance, with a desired amount of offset from the vertical surface, and in a level position whereby a fastener such as that indicated by the nail 86 may be employed to permanently secure the outlet box to the member 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mounting device for supporting an electrical outlet box in adjustably fixed relation to and upon a structural element comprising a base, a pair of supports on said base in parallel side-by-side relation and projecting laterally therefrom for receiving an outlet box therebetween, means mounting said supports upon said base for independent relative adjustment towards and from each other, spring clips on the adjacent sides of said supports for engaging and holding an outlet box when received between said supports, a supporting fastener on said base on the opposite side thereof from said supports for positioning the base in a vertically adjusted position, members constituting gauge means mounted on said base on the same side thereof as said supports and projecting laterally from said base for engaging a vertical surface of said structural element to thereby position said base at a predetermined distance therefrom, said members having means for independent longitudinal extensional adjustment.

2. The combination of claim 1 wherein said support mounting means comprises a slot in said base, said supports having fasteners slidable in said slot.

3. The combination of claim 1 wherein said support mounting means comprises a slot in said base, said supports having fasteners slidable in said slot, said supports having each a portion slidably guided in said slot.

4. The combination of claim 1 wherein said supports have lugs thereon disposed on opposite top and bottom sides of said spring clips and adapted to engage and support an outlet box when the latter is clamped to said supports by said clips.

5. The combination of claim 1 wherein said base has laterally projecting arms, said members comprising plates slidably engaging said arms and extending longitudinally therefrom, fastening means securing the plates in longitudinally adjusted position upon said arms.

6. The combination of claim 1 wherein said base has laterally projecting arms, said members comprising plates slidably engaging said arms and extending longitudinally therefrom, fastening means securing the plates in longitudinally adjusted position upon said arms, said fastening means including cooperating apertures and slots in said arms and plates and a fastener extending through said apertures and slots.

7. The combination of claim 1 wherein said base has laterally projecting arms, said members comprising plates slidably engaging said arms and extending longitudinally therefrom, fastening means securing the plates in longitudinally adjusted position upon said arms, said plates having guide flanges slidably embracing the top and bottom surfaces of said arms.

8. The combination of claim 1 wherein said base has laterally projecting arms, said members comprising plates slidably engaging said arms and extending longitudinally therefrom, fastening means securing the plates in longitudinally adjusted position upon said arms, said plates having guide flanges slidably embracing said arms, indicia on said guide flanges positioned for visual comparison with a portion of said base for indicating the amount of offset from said vertical surface of an outlet box when carried by the supports.

9. The combination of claim 1 wherein said fastener comprises a clamp mounted on said base for gripping a vertical electric conduit and thereby positioning the base at a predetermined vertical position.

References Cited in the file of this patent

UNITED STATES PATENTS

| | | |
|---|---|---|
| 910,625 | Wolfe et al. | Jan. 26, 1909 |
| 1,453,017 | Lindelof | Apr. 24, 1923 |
| 1,834,026 | Hall | Dec. 1, 1931 |
| 2,443,859 | Jacobs | June 22, 1948 |
| 2,812,149 | Appleton | Nov. 5, 1957 |